United States Patent [19]
Craig

[11] Patent Number: 6,131,958
[45] Date of Patent: Oct. 17, 2000

[54] DRYER HOSE CONNECTOR

[76] Inventor: Bruce Craig, c/o P.O. Box 5372, Portland, Oreg. 97228

[21] Appl. No.: 09/287,395

[22] Filed: Apr. 6, 1999

Related U.S. Application Data

[60] Provisional application No. 60/080,856, Apr. 6, 1998.

[51] Int. Cl.⁷ .................................................. F16L 27/00
[52] U.S. Cl. ...................... 285/136.1; 285/401; 285/360
[58] Field of Search .......................... 285/401, 73, 136.1, 285/360, 376

[56] References Cited

U.S. PATENT DOCUMENTS

| | | | |
|---|---|---|---|
| 12,937 | 5/1855 | Hicks | 285/401 |
| 936,566 | 10/1909 | Rosendahl | 285/401 |
| 1,474,586 | 11/1923 | Hanrahan | 285/401 |
| 1,738,996 | 12/1929 | Hamilton et al. | 285/73 |
| 2,160,354 | 5/1939 | Evans | 285/73 |
| 3,709,526 | 1/1973 | Cromie | 285/73 |
| 4,602,654 | 7/1986 | Stehling | 285/401 |

*Primary Examiner*—Eric K. Nicholson
*Attorney, Agent, or Firm*—Marger Johnson & McCollom, P.C.

[57] ABSTRACT

A hose connector having a pair of flanged cylindrical members which can be readily connected and disconnected by insertion of one or more protruding lugs on one flange into corresponding openings in the other flange.

2 Claims, 4 Drawing Sheets

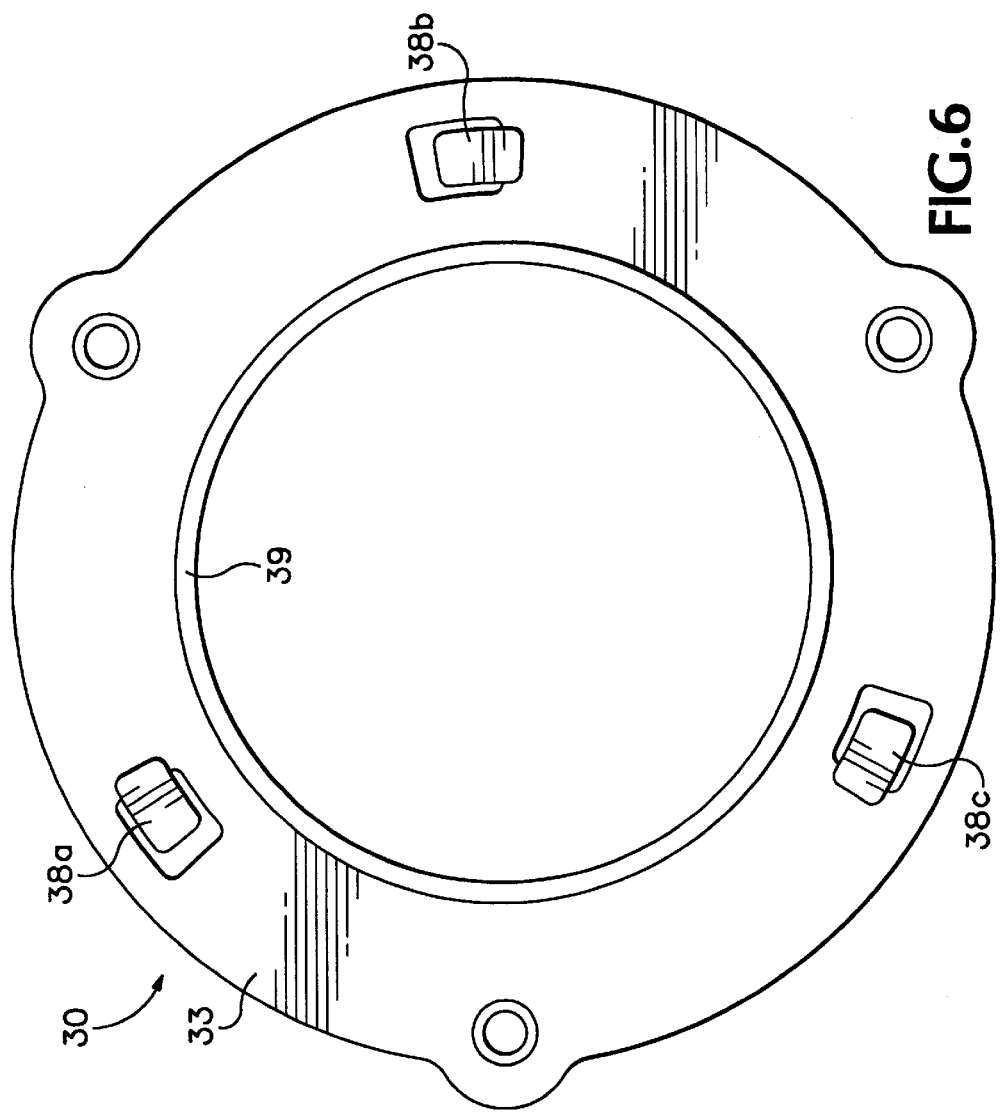
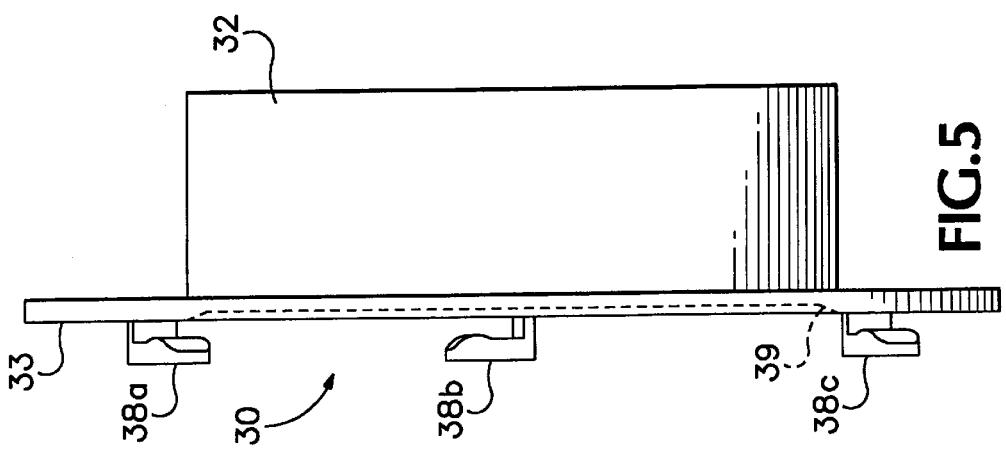

DRYER HOSE CONNECTOR

This application is related to U.S. application Ser. No. 60/080,856, the specification of which is incorporated herein by reference.

BACKGROUND OF THE INVENTION

This invention relates to hoses used to vent appliances, and in particular to a connector for connecting a clothes dryer discharge hose to an exhaust vent hose or fixture.

Clothes dryers, and other appliances, often include a discharge hose to exhaust a discharge air stream from the appliance. Dryer hoses are somewhat troublesome to connect and disconnect form a discharge as required to install, remove or service the appliance. The typical dryer installation puts the hose behind the dryer, and many times the dryer must be moved in order to disconnect, inspect, clean, or replace the dryer hose. Further difficulty lies in the manner in which the exhaust hose is connected to the discharge vent (normally one or more large hose clamps), and in the tendency of the thin, flexible walls of the relatively large diameter hoses to bend out of shape. A need therefore remains for an improved dryer hose discharge connection which addresses the shortcomings of the prior art.

SUMMARY OF THE INVENTION

The present invention provides a reliable, simple and quick coupler for connecting dryer hoses to exhaust vents for any installation. The invention simplifies inspection and cleaning of dryer hoses to minimize the potential fire hazard from lint buildup in a dryer hose, and provides a more secure hose to exhaust vent connection to prevent disconnection of the hose from the vent.

BRIEF DESCRIPTION OF THE DRAWINGS

FIG. 5 is a side elevational view of the discharge hose portion shown in FIG. 4.

FIG. 6 is a top plan view of the discharge hose portion shown in FIG. 4.

DETAILED DESCRIPTION OF THE PREFERRED EMBODIMENT

Figure 1:
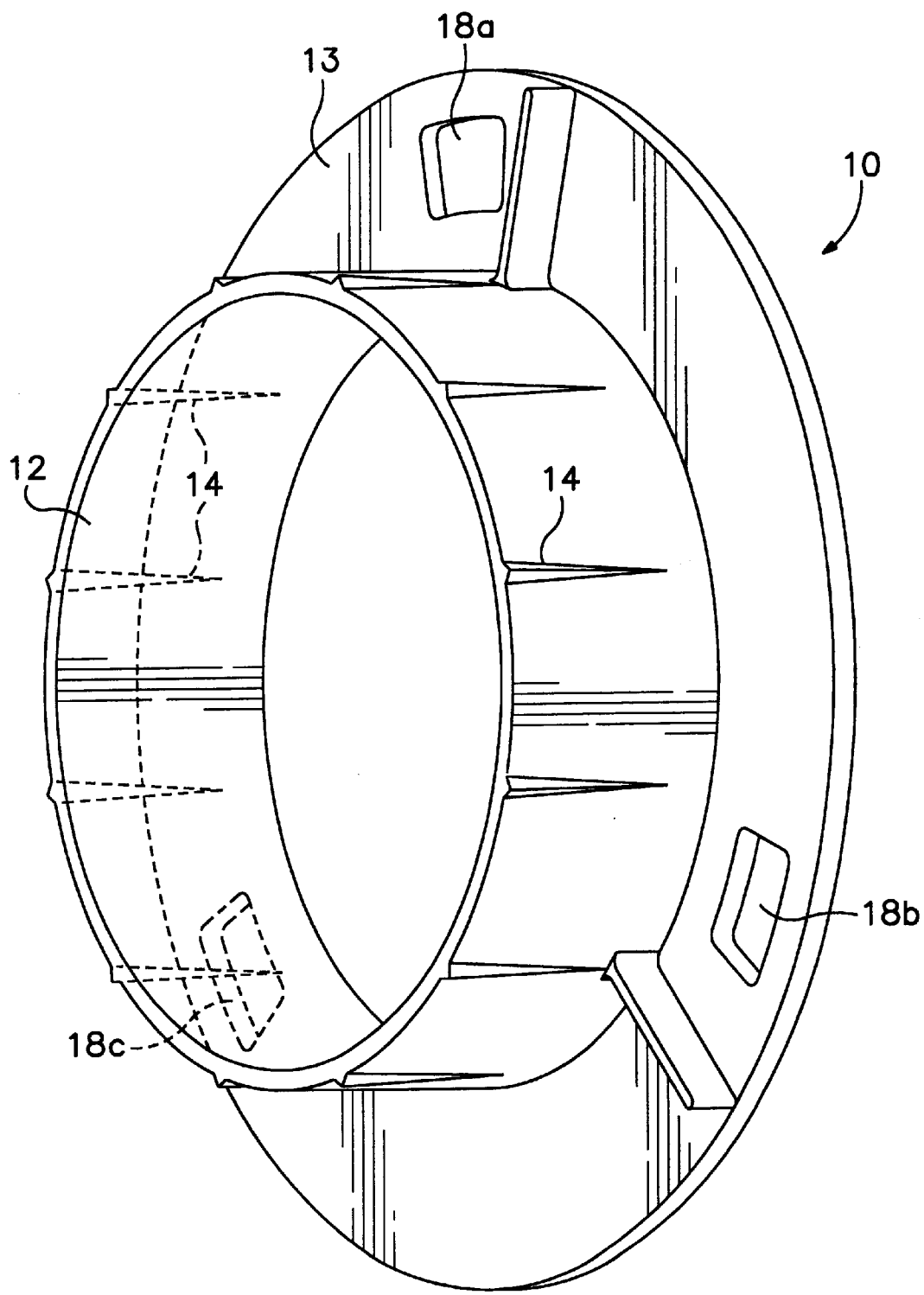
FIG. 1 is a perspective view of the discharge hose portion of one embodiment of the invention.
Figure 3:
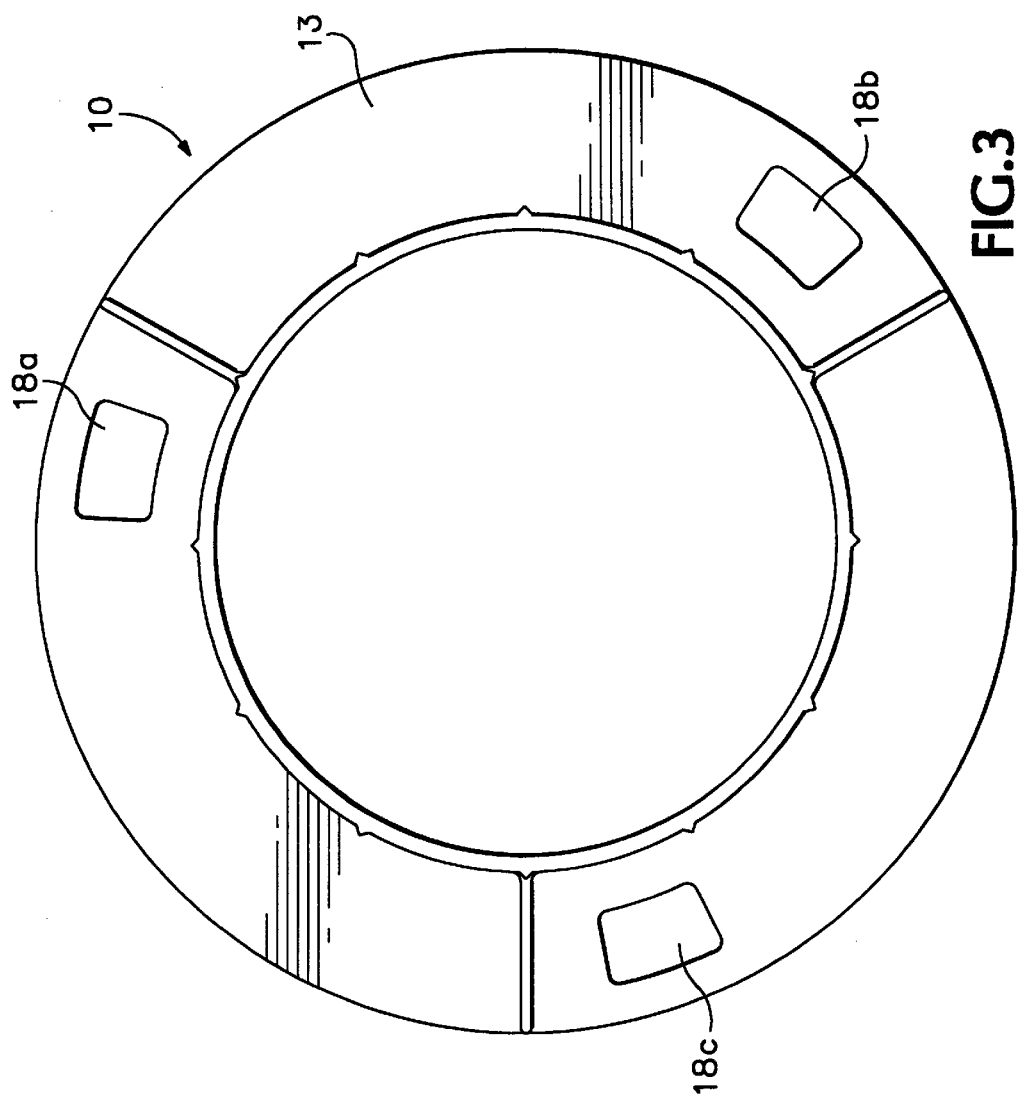
FIG. 3 is a top plan view of the discharge hose portion shown in FIG. 1.
Figure 2:
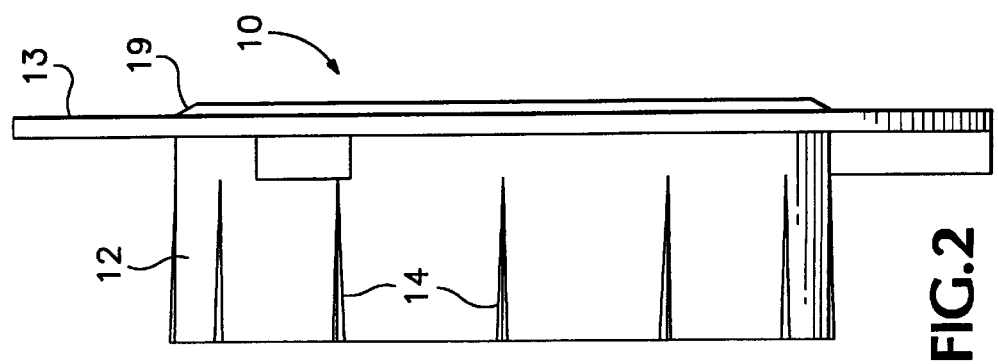
FIG. 2 is a side elevational view of the discharge hose portion shown in FIG. 1.
Figure 4:
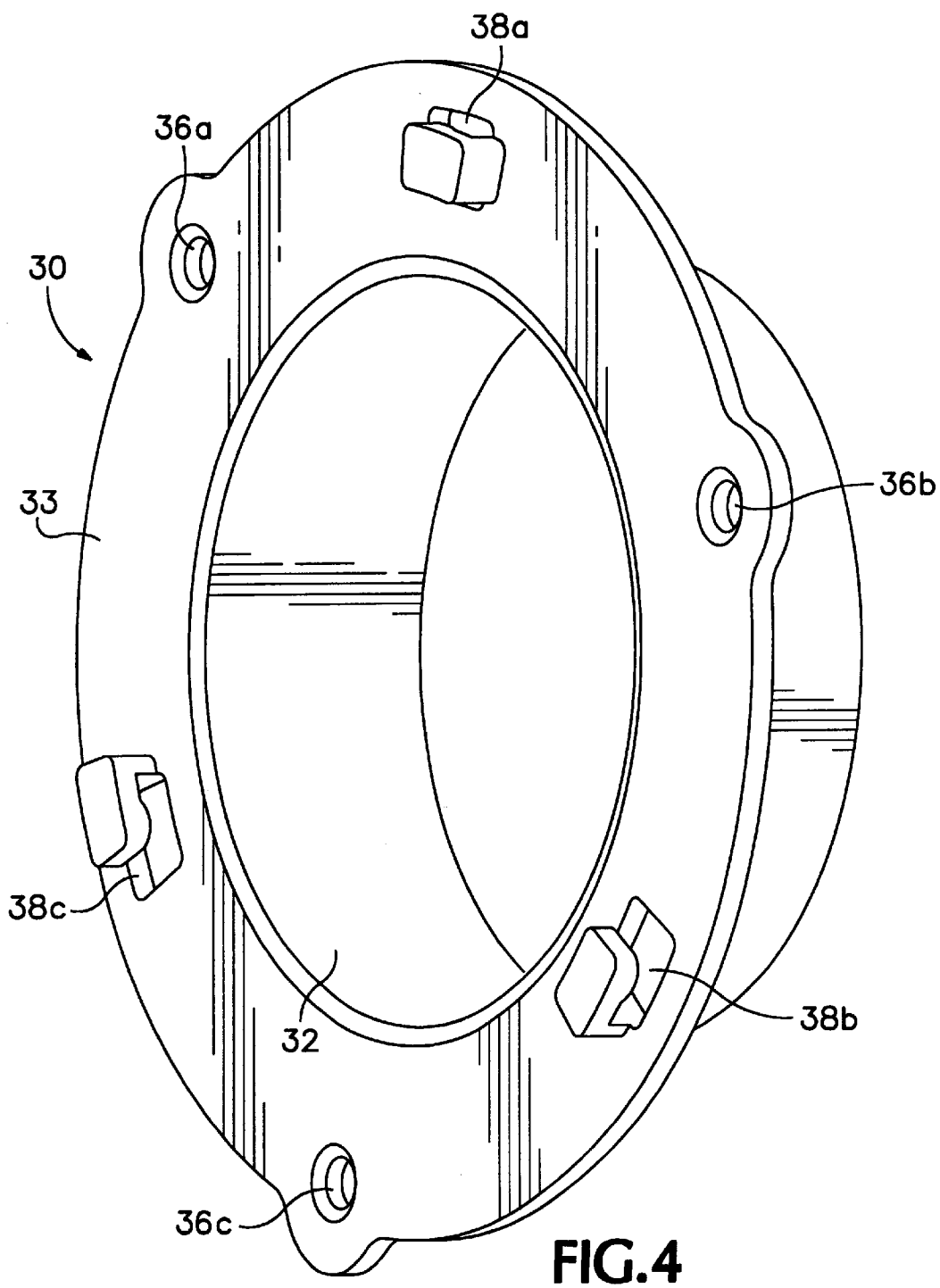
FIG. 4 is a perspective view of the exhaust vent portion of one embodiment of the invention.

Turning now to FIGS. 1–6, a dryer hose connector according to a preferred embodiment of the invention includes a first member 10 (FIG. 1) and a second member 30 (FIG. 4). Each of members 10 and 30 includes a cylindrical portion 12 and 32 respectively, and flanges 13 and 33 respectively. In one embodiment, portions 12 and 32 are sized to be received into a flexible dryer hose (not shown). Reinforcing ribs 14 are provided for added strength, and to permit attaching the connector to the hose without the need for clamps. First member 10 is preferably attached by cylindrical portion 12 to the discharge hose of a dryer or other appliance. Second member 30 is preferably attached to a hose connected to a discharge vent from the room in which the appliance is located. Second member 30 may be mounted to the wall, floor, or ceiling with three screw fasteners inserted through holes 36a–c spaced at 120 degree intervals around the flange 33. Member 10 includes an annular sealing surface 19 which in the preferred embodiment protrudes slightly from flange 13. Member 30 includes a corresponding sealing surface 39 which engages sealing surface 13 to provide a substantially gas-tight seal between members 10 and 30.

Flange 13 includes three openings 18a–c which, in the preferred embodiment, are spaced evenly around the flange. Flange 33 includes three protruding lugs 38a–c which are spaced about flange 33, and which are positioned to engage each of openings 18a–c respectively. Member 10 interconnects with member 30 by being rotated which moves a portion of the flange adjacent each of openings 18a–c beneath a respective resilient lug 38, which holds flange 13 in place. Members 10 and 30 are disengaged in reverse order; flanges members 10 and 30 are rotated in the opposite direction until lugs 38a–c can be removed from openings 18a–c. Those of skill in the art will appreciate that the shape of openings 18 and lugs 38, and other details of the invention, could be varied from those shown without departing from the spirit and scope of the following claims. In the preferred embodiment, members 10 and 30 are formed of a molded polymeric material, although any material or method of forming is considered within the scope of the invention.

I claim:

1. A hose connector comprising:

a first member having a cylindrical portion engageable with a hose, the cylindrical portion having a plurality of longitudinal ribs, a first transverse flange connected to the cylindrical portion and adapted for being mounted to a wall, and at least one protruding member having a resilient transverse portion;

a second member having a cylindrical portion engageable with a vent, the cylindrical portion having a plurality of longitudinal raised ribs, a second transverse flange connected to the cylindrical portion, and surfaces defining at least one opening in the second transverse flange; and the at least one protruding resilient member receivable within the at least one opening in the second transverse flange, and resiliently engageable with the second transverse flange responsive to rotation of the second flange relative to the first flange.

2. A hose connector according to claim 1 wherein the first flange includes a protruding sealing surface adjacent an inner diameter of the first flange, and the second flange includes a recessed surface adjacent an inner diameter of the second flange adapted to engage the protruding sealing surface.

* * * * *